United States Patent
Koiwai

(10) Patent No.: US 6,785,059 B2
(45) Date of Patent: Aug. 31, 2004

(54) LENS BARREL

(75) Inventor: Tamotsu Koiwai, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/313,656

(22) Filed: Dec. 6, 2002

(65) Prior Publication Data
US 2003/0147156 A1 Aug. 7, 2003

(30) Foreign Application Priority Data

Dec. 11, 2001 (JP) ........................................ 2001-377613

(51) Int. Cl.$^7$ ............................................ G02B 15/14
(52) U.S. Cl. ........................ 359/704; 359/694; 359/699
(58) Field of Search ................................. 359/694, 699, 359/700, 701, 703, 704

(56) References Cited

U.S. PATENT DOCUMENTS

| | | | |
|---|---|---|---|
| 6,487,025 B2 * | 11/2002 | Koiwai et al. .............. | 359/699 |
| 6,522,482 B2 * | 2/2003 | Nomura et al. ............. | 359/701 |
| 6,522,840 B2 * | 2/2003 | Kano et al. ................. | 396/379 |
| 6,637,951 B2 * | 10/2003 | Sasaki ........................ | 396/349 |

* cited by examiner

Primary Examiner—Ricky Mack
(74) Attorney, Agent, or Firm—Volpe and Koenig, P.C.

(57) ABSTRACT

A lens barrel having lens holding frames for holding a plurality of lenses is composed of a first lens, a second lens, one of the lens holding frames holding the first and second lenses, having a first opening disposed at one end in correspondence with the first lens, and having a second opening disposed at another end in correspondence with the second lens, first abutment portions prescribing the position of the first lens in an optical axis direction on the first opening side and disposed at a plurality of positions around the inner periphery of the lens holding frame, a second abutment portion prescribing the position of the second lens in the optical axis direction on the second opening side, first engagement portions disposed at a plurality of positions around the inner periphery of the lens holding frame on a side nearer to the first opening than the first and second abutment portions and engaged with the first lens, and a second engagement portion disposed around the inner periphery of the lens holding frame on a side nearer to the second opening than the first and the second abutment portion and engaged with the second lens, wherein the first engagement portions and the first abutment portions are disposed at different positions in the circumferential direction of the lens holding frame.

19 Claims, 7 Drawing Sheets

LENS BARREL

This application claims benefit of Japanese Application No. 2001-377613 filed Dec. 11, 2001, the contents of which are incorporated by this reference.

BACKGROUND OF THE INVENTION

1. Field of the Invention

The present invention relates to a lens barrel, and more particularly, to a lens barrel in which a plurality of optical elements are fixed and held with a high accuracy and which has a high optical performance.

2. Related Background Art

Conventionally, a lens barrel for holding a photographing optical system used in a photographing apparatus (camera) and the like is ordinarily formed of plastic parts and the like molded by injection molding and so on.

Here, the lens barrel is arranged such that a plurality of optical elements such as lenses and the like constituting the photographing optical system are held by frame members, support members, and the like (hereinafter, simply referred to as frame members and the like) corresponding to the respective optical elements, and these frame members and the like are relatively moved in a direction along an optical axis.

In this case, the optical axes of the plurality of optical elements constituting the photographing optical system must be in agreement with each other.

For example, when the respective optical axes of a plurality of optical elements held by a single frame member and the like or the respective optical axes of a plurality of optical elements held by a plurality of frame members and the like are not in agreement with each other, an optical performance cannot be maintained and an excellent subject image cannot be formed.

Accordingly, when the lens barrel is manufactured, it is a very important problem to secure the accuracy of parts such as the respective frame members and the like constituting the lens barrel. Specifically, surfaces for prescribing the positions of the respective optical elements held by, for example, the frame members, that is, lens position prescribing surfaces in the radial direction and the optical axis direction of the optical elements (hereinafter, simply referred to as position prescribing surfaces) must be accurately prescribed.

For this purpose, an arrangement shown in, for example, FIG. 11 is used in a conventional lens barrel.

FIG. 11 is an enlarged main portion sectional view showing only an upper half portion of the optical elements about the optical axis thereof by taking out a frame member constituting a part of the conventional lens barrel and the optical elements held by the frame member. Further, FIG. 12 is a sectional view showing a part of molds for injection molding the frame member shown in FIG. 11, the sectional view showing a region corresponding to FIG. 11.

As shown in FIG. 11, the frame member 116 constituting a part of the conventional lens barrel is composed of a frame portion 116a for fixing and holding the plurality of optical elements and a support portion 116b for holding the frame portion 116a.

The frame portion 116a is formed to hold a front lens group 156a as a first lens and a rear lens group 156b as a second lens, respectively.

In this case, the position of the front lens group 156a in a direction along an optical axis O is prescribed by a position prescribing surface, which is denoted by a reference numeral 116c, of the frame portion 116a. Further, the position of the front lens group 156a in a diameter direction is prescribed by a position prescribing surface, which is denoted by a reference numeral 116d, of the frame portion 116a.

In contrast, the position of the rear lens group 156b in the direction along the optical axis O is prescribed by a position prescribing surface, which is denoted by a reference numeral 116e, of the frame portion 116a. Further, the position of the rear lens group 156b in the diameter direction is prescribed by a position prescribing surface, which is denoted by a reference numeral 116f, of the frame portion 116a.

To mold the frame portion 116a arranged as described above, the injection molding mold as shown in FIG. 12, that is, a first mold member 120 and a second mold member 121 are used.

Note that a line denoted by a symbol X in FIG. 12 shows a dividing position of the mold members 120 and 121.

In this case, the position prescribing surface 116c (the optical axis direction) in the frame portion 116a is formed by a surface, which is denoted by a reference numeral 121c, of the second mold member 121. Further, the position prescribing surface 116d (the diameter direction) in the frame portion 116a is formed by a surface denoted by a reference numeral 121d of the second mold member 121.

In contrast, the position prescribing surface 116e (the optical axis direction) of the frame portion 116a is formed by a surface, which is denoted by a reference numeral 121e, of the second mold member 121. Further, the position prescribing surface 116f (the diameter direction) of the frame portion 116a is formed by a surface, which is denoted by a reference numeral 121f, of the second mold member 121.

The plurality of optical elements (156a, 156b) are sequentially inserted into frame portion 116a arranged as described above from the same direction, that is, from the side of a rear opening 116g and assembled.

Accordingly, in the molds (120, 121) used when the frame portion 116a in the lens barrel is molded, all the position prescribing surfaces (116c, 116d, 116e, 116f) of the plurality of optical elements (156a, 156b) are molded by the single mold member 121. In contrast, in manufacture, the dimensional accuracy of parts can be easily increased by molding them in the same molding member. From the above arrangement, in this example, the frame portion 116a, which can prescribe the positions of the respective optical elements (156a, 156b) easily with a high accuracy, can be realized.

As described above, the frame member (116) of the lens barrel, which is to be molded from the molds (120, 121) of a mode shown in FIG. 12, is assembled by sequentially inserting the plurality of optical elements from the same direction with respect to the frame member, that is, from the rear opening 116g into the inside of the frame portion 116a.

Therefore, as shown in FIG. 12, the diameter Rb of the surface 121f of the second mold member 121 corresponding to the position prescribing surface 116f of the other rear lens group 156b in the diameter direction must be definitely set larger than the diameter Ra of the surface 121d of the second mold member 121 corresponding to the position prescribing surface 116d of the one front lens group 156a in the diameter direction (Ra<Rb).

As a result, a step denoted by a reference numeral d0 (=(Rb·Ra)/2) is arisen between the position prescribing surfaces 116d and 116f in the diameter direction, as shown in FIG. 11.

Further, in the example shown in FIG. 11, since the lens group 156a must be fixed to the frame member 116, the front lens group 156a is fixed to the frame member 116 on, for example, the outer peripheral portion of the lens group 156a through an adhesive 200. Thus, in this case, a bonding portion where the lens group 156a is fixed must be interposed between the lens groups 156a and 156b.

That is, the step shown by the reference numeral d0 must be formed so as to secure an adhesive reservoir for applying the adhesive 200, thereby the diameter of the frame portion 116a is increased.

Note that, in the case shown in FIG. 11, the lens group 156b is also fixed to the frame member 116 on the outer peripheral portion thereof through an adhesive 201.

From the above arrangement, in the lens barrel of the mode described above, the dimension in the diameter direction of the frame portion 116a is increased from the necessity for securing the position prescribing surfaces of the respective optical elements, from which a problem is arisen in that the frame portion 116a and, the mold members 121, 122 for molding it are increased in size.

Further, in the lens barrel of the mode described above, the position prescribing surfaces of the respective optical elements in the direction along the optical axis cannot be disposed at positions where they confront with each other, from which a problem is also arisen in that it is difficult to sufficiently secure a dimensional accuracy of the interval between adjacent optical elements. Further, when it is intended to interpose an aperture portion between the lens groups 156a and 156b in the lens barrel of the mode described above, the diameter of the opening of the aperture portion is smaller than the outside diameter of the lens group 156a. Thus, it is difficult to form the aperture portion integrally with the frame member 116 from the view point of assembly, from which a problem is arisen in that the lens barrel of the mode described above has a structure requiring a different member.

SUMMARY OF THE INVENTION

A feature of the present invention is to provide a lens barrel capable of holding a plurality of optical elements constituting a photographing optical system while securing a high relative coaxial accuracy between the optical elements and a high dimensional accuracy between the elements and capable of contributing to the further miniaturization of a camera and the like.

To briefly describe, a first invention is a lens barrel having lens a holding frame for holding a plurality of lenses, the lens barrel being characterized by including a first lens, a second lens, a lens holding frame holding the first and second lenses, having a first opening disposed at one end in correspondence to the first lens, and having a second opening disposed at the other end in correspondence to the second lens, first abutment portions prescribing the position of the first lens in an optical axis direction on the first opening side and disposed at a plurality of positions around the inner periphery of the lens holding frame, a second abutment portion prescribing the position of the second lens in the optical axis direction on the second opening side, first engagement portions disposed at a plurality of positions around the inner periphery of the lens holding frame on a side nearer to the first opening than the first and second abutment portions and engaged with the first lens, and a second engagement portion disposed around the inner periphery of the lens holding frame on a side nearer to the second opening than the second abutment portion and engaged with the second lens, wherein the first engagement portions and the first abutment portions are disposed at different positions in the circumferential direction of the lens holding frame.

Further, a second invention is a lens barrel characterized by including a first lens, a second lens, a lens holding frame holding the first and second lenses, having a first opening disposed at one end in correspondence to the first lens, and having a second opening disposed at the other end in correspondence to the second lens, a first engagement portion disposed to the lens holding frame on the first opening side thereof and engaged with the first lens, a second engagement portion disposed to the lens holding frame on the second opening side thereof and engaged with the second lens, wherein the first and second engagement portions are molded by the same metal mold.

Then, a third invention is a lens barrel including a first lens, a second lens the diameter of which is larger than that of the first lens, and an approximately cylindrical lens holding frame holding the first and second lenses, having a first opening disposed at one end in correspondence to the first lens, and having a second opening disposed at the other end in correspondence to the second opening, wherein the lens holding frame is molded by a first metal mold on the first opening side and a second metal mold on the second opening side. Further, the lens barrel includes first abutment portions prescribing the position of the first lens in an optical axis direction on the first opening side, disposed at a plurality of positions around the inner periphery of the lens holding frame, and projecting toward the inner periphery of the lens holding frame, respectively and the first abutment portions are molded by the first metal mold. Then, the lens barrel includes a second abutment portion prescribing the position of the second lens in the optical axis direction on the second opening side, and the second abutment portion is molded by the second metal mold. Further, the lens barrel includes first engagement portions disposed at a plurality of positions around the inner periphery of the lens holding frame on a side nearer to the first opening than the first and second abutment portions, and engaged with the first lens, the first engagement portions being molded by the second metal mold. Further, the lens barrel includes a second engagement portion disposed around the inner periphery of the lens holding frame on a side nearer to the second opening than the first and second abutment portions and engaged with the second lens, and the second engagement portion is molded by the second metal mold. In the above arrangement, the first engagement portions and the first abutment portions are disposed at different positions in the circumferential direction of the lens holding frame.

These and other features and benefits of the present invention will be more apparent from the following detailed description.

According to the present invention, there can be provided a lens barrel capable of holding a plurality of optical elements constituting a photographing optical system while securing a pinpoint relative coaxial accuracy between the optical elements and a pinpoint dimensional accuracy between the elements and capable of contributing to the further miniaturization of a camera and the like.

DETAILED DESCRIPTION OF THE PREFERRED EMBODIMENTS

A lens barrel of an embodiment of the present invention will be described below.

Figure 1:
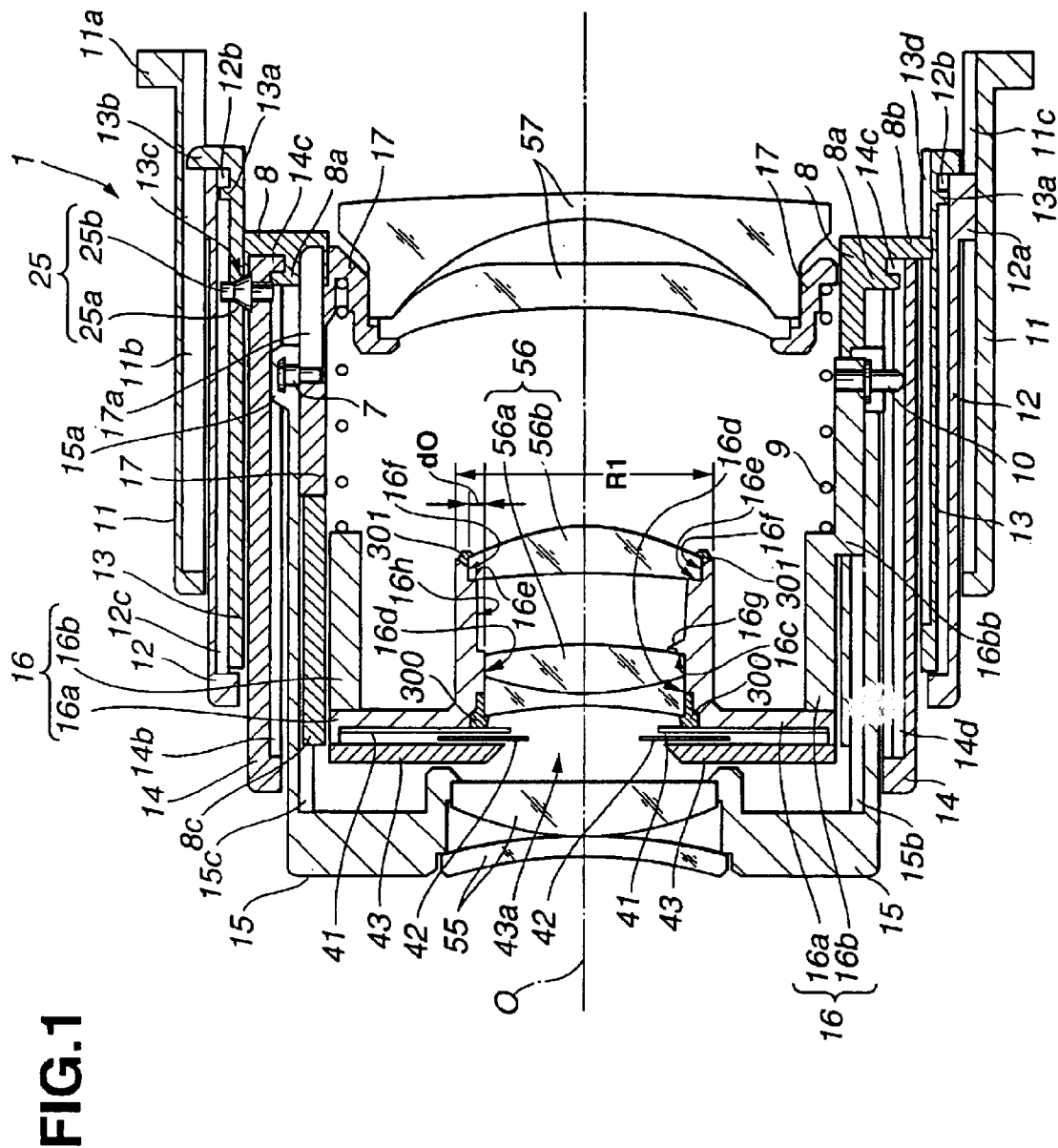
FIG. 1 is a longitudinal sectional view of a photographing optical system in a direction along an optical axis and shows internal constituting members of a lens barrel of an embodiment of the present invention.

FIG. 1 is a longitudinal sectional view of a photographing optical system in a direction along an optical axis and shows internal constituting members of the lens barrel of the embodiment of the present invention.

Figure 2:
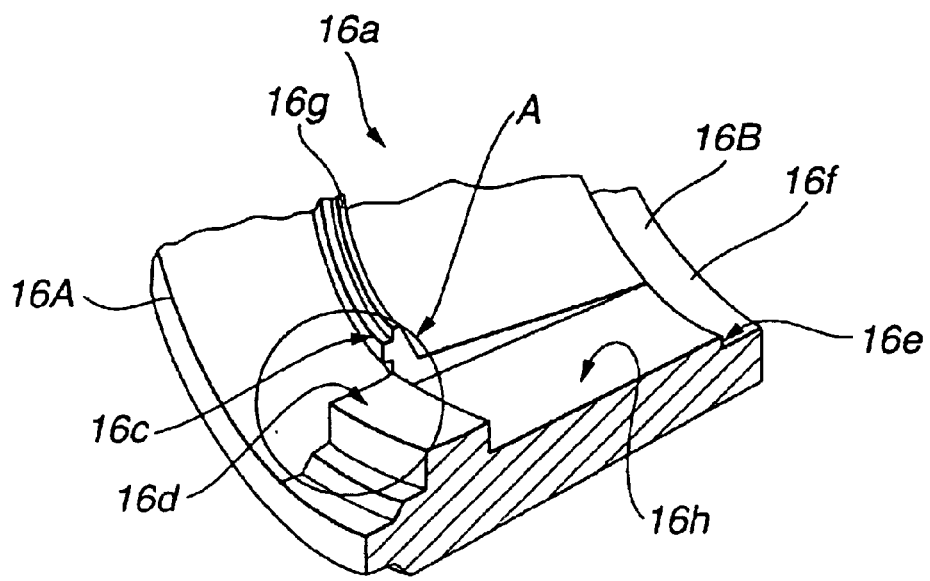
FIG. 2 is an enlarged main portion perspective view showing a part in enlargement, which is cut out, of a frame portion of a second lens frame in the lens barrel of FIG. 1.
Figure 3:
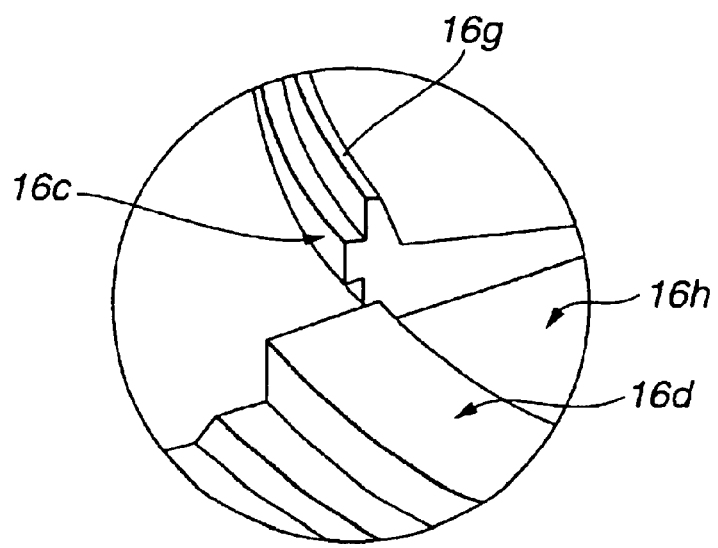
FIG. 3 is an enlarged main portion perspective view showing a portion (portion A) of FIG. 2 by further enlarging the portion.

FIG. 2 is an enlarged main portion perspective view showing a part in enlargement, which is cut out, of a frame portion 16a of a second lens frame 16 in the lens barrel 1 of FIG. 1, and FIG. 3 is an enlarged main portion perspective view showing a portion (portion A) of FIG. 2 by further enlarging the portion.

Further, FIGS. 4–10 show molds for molding a part of the second lens frame (16) of frame members constituting the lens barrel of the embodiment.

First, an internal arrangement of the lens barrel 1 of the embodiment will be schematically described below.

As shown in FIG. 1, the lens barrel 1 of the embodiment is composed of a photographing optical system composed of a plurality of optical elements (55, 56, 57), lens holding frame members (15, 16, 17) for fixing and holding the respective optical elements constituting the photographing optical system, frame members (11, 12, 13, 14) capable of moving these lens holding frame members in the direction along the optical axis O of the photographing optical system, and the like.

The photographing optical system of the lens barrel 1 of the embodiment is composed of the first lens group 55 fixed and held by the first lens frame 15, the second lens group 56 fixed and held by the second lens frame 16, and the third lens group 57 fixed and held by the third lens frame 17. The first, second, and third lens groups 55, 56, 57 are disposed such that they move in the direction along the optical axis O from the side of a subject in this sequence and that the center axes of the respective lens groups are in approximate agreement with each other at all times.

The lens barrel 1 is fixed by the fixing frame 11 at a predetermined position on a front surface of a camera and the like employing it. The fixing frame 11 is formed in an approximately cylindrical shape and has a straight groove 11b and a helicoid 11c. The straight groove 11b is formed on the inner peripheral surface of the fixing frame 11 in the direction along the optical axis O, and a helicoid 11c is formed over the entire inner peripheral surface of the fixing frame 11.

Further, a fixing portion 11a is formed in the vicinity of the rear end of the fixing frame 11 to fix and support the lens barrel 1 to and by a fixing member (not shown) of the camera and the like using the lens barrel 1. The rotary frame 12 formed in an approximately cylindrical shape is disposed in the fixing frame 11. A helicoid 12a is formed on the outer periphery of the rotary frame 12 in the vicinity of the rear end thereof. The helicoid 12a is threaded with the helicoid 11c of the fixing frame 11.

Further, a bayonet 12b is formed on the inner peripheral surface of the rotary frame 12 in the vicinity of the rear end thereof to rotatably couple the rotary frame 12 with the moving frame 13. The bayonet 12b is engaged with a bayonet 13a of the moving frame 13 which will be described later.

Then, a straight groove 12c is also formed on the inner peripheral surface of the rotary frame 12 in the direction along the optical axis O.

The moving frame 13 formed in an approximately cylindrical shape is disposed in the rotary frame 12. A straight key 13b projects outward from the rearmost end of the moving frame 13 toward. The straight key 13b is slidably inserted into the straight groove 11b of the fixing frame 11. With this arrangement, the rotation of the moving frame 13 is regulated as well as the moving frame 13 being limited to move only in the direction along the optical axis O. That is, the straight groove 11b of the fixing frame 11 acts as a means for guiding the movement of the moving frame 13 in the direction along the optical axis O.

Further, the bayonet 13a projects outward from the outer peripheral surface of the moving frame 13 in the vicinity of the rear end thereof and is engaged with the bayonet 12b of the rotary frame 12. Accordingly, the engagement of the bayonet 12b of the rotary frame 12 with the bayonet 13a of the moving frame 13 permits the moving frame 13 to be coupled with the rotary frame 12 so that they can rotate relatively to each other. Further, both the moving frame 13 and the rotary frame 12 can move integrally with each other in the direction along the optical axis O.

Then, a cam groove 13c is drilled at a predetermined position of the moving frame 13 near to the rear end thereof, and a pin portion 25b and a tapered portion 25a of a cam follower 25 of the cam frame 14, which will be described later, are inserted into the cam groove 13c.

Further, a straight groove 13d is formed on the inner peripheral surface of the moving frame 13 in the direction along the optical axis O, and a key portion 8b of a float key 8, which will be described later, is inserted into the straight groove 13d.

The cam frame 14 formed in an approximately cylindrical shape is disposed in the moving frame 13. The cam follower 25 is implanted outward on the outer peripheral surface of the cam frame 14 at a predetermined position thereof. The cam follower 25 is inserted into the cam groove 13c of the moving frame 13 as well as being slidably engaged with the straight groove 12c of the rotary frame 12.

Further, a bayonet 14c is formed at the rear end of the cam frame 14 so as to project inward. A key portion 8a of the float key 8, which will be described later, is engaged with the bayonet 14c. With this arrangement, the cam frame 14 and the float key 8 can rotate relatively to each other as well as movingly integrally with each other in the direction along the optical axis O.

Then, a helicoid 14b is formed on the inner peripheral surface of the cam frame 14. A helicoid 15a is disposed on the outer peripheral surface of the first lens frame 15 in the vicinity of the rear end thereof and threaded with the helicoid 14b.

Further, a cam groove 14d having a predetermined shape is formed on the inner peripheral surface of the cam frame 14, and a cam follower 10 is implanted on the outer peripheral surface of the second lens frame 16 and inserted into the cam groove 14d. With this arrangement, the cam frame 14 is cam-coupled with the second lens frame 16.

The float key 8 is disposed in the cam frame 14. The float key 8 is formed of the key portion 8a engaged with the bayonet 14c at the rear end of the cam frame 14, the key portion 8b being inserted into the straight groove 13d on the inner peripheral surface of the moving frame 13, and a key portion 8c being inserted into a straight groove 15c on the inner peripheral surface of the first lens frame 15.

With this arrangement, the float key 8 is moved integrally with the cam frame 14 by the engagement of the bayonet 14c of the cam frame 14 with the key portion 8a and guided straight by the moving frame 13 in the direction along the optical axis O because the straight groove 13d of the moving frame 13 is engaged with the key portion 8b. Further, the float key 8 moves along a straight line in the direction along the optical axis O of the first lens frame 15 (and the third lens frame 17) by the engagement of the straight groove 15c of the first lens frame 15 with the key portion 8c.

Further, the first lens frame 15 having one end closed and formed in an approximately cylindrical shape is disposed in the cam frame 14. The first lens group 55 composed of a plurality of optical elements is firmly fixed to the closed end disposed on the front surface side of the first lens frame 15. Note that a hole, through which light can pass, is drilled at the position where the first lens group 55 is firmly fixed, and the first lens group 55 is exposed outward.

As described above, the helicoid 15a is formed on the outer periphery of the first lens frame 15 in the vicinity of the rear end thereof. The helicoid 15a is threaded with the helicoid 14b on the inner periphery of the cam frame 14.

Further, a stopper pin 7 projects inward from the first lens frame 15 in the vicinity of the rear end thereof. The stopper pin 7 is abutted against the front side wall of a groove portion 17a formed in the third lens frame 17 to thereby perform a role of prescribing a position of the third lens frame 17 in the direction along the optical axis O.

Further, the straight groove 15c and a straight groove 15b are formed on the inner peripheral surface of the first lens frame 15. The key portion 8c of the float key 8 is slidably engaged with the straight groove 15c, and a key portion 16bb of the second lens frame 16, which will be described later, is inserted into the straight groove 15b.

Accordingly, the engagement of the key portion 8c with the straight groove 15c causes the first lens frame 15 to be guided straight in the direction along the optical axis O, and the engagement of the key portion 16bb with the straight groove 15b causes the second lens frame 16 to be guided straight.

The second lens frame 16 and the third lens frame 17 are disposed in the first lens frame 15.

The second lens frame 16 is composed of the frame portion 16a and a support portion 16b. The frame portion 16a fixes and holds a plurality of optical elements, and the support portion 16b is formed integrally with the frame portion 16a and has an interlock means (cam follower 10) for interlocking the second lens frame 16 and the cam frame 14.

The second lens group 56 composed of the plurality of optical elements 56a, 56b is fixed to and held by the frame portion 16a through a predetermined means.

In this case, the position in the direction along the optical axis O of the first lens 56a and the second lens group 56 is prescribed by a (lens) position prescribing surface 16c from the front surface side thereof, and the position in the diameter direction of the first lens 56a is prescribed by (lens) position prescribing surfaces 16d.

In contrast, the position in the direction along the optical axis O of the second lens 56b of the second lens group 56 is prescribed by a (lens) position prescribing surface 16e from the rear side thereof, and the position in the diameter direction of the second lens 56b is prescribed by a (lens) position prescribing surface 16f. Note that the second lens frame 16 will be described later in detail.

Further, a sheet member 41 is firmly fixed to the frame portion 16a on the front surface side thereof to regulate an aperture opening, and further a shutter mechanism 42 is disposed on the front surface side. Then, a lid member 43 is disposed so as to cover the front surface of the shutter mechanism 42. Note that an opening 43a is defined at an approximate center of the lid member 43 so that the light from the subject passes through the opening 43a.

As described above, the cam follower 10 projects outward from the support portion 16b in the vicinity of the rear end thereof. The cam follower 10 is cam-coupled with the cam groove 14d of the cam frame 14.

Further, the key portion 16bb is formed integral to the support portion 16b at the rear end thereof and slidably engaged with the straight groove 15b of the first lens frame 15. With this arrangement, the second lens frame 16 is guided straight in the direction along the optical axis O with respect to the first lens frame 15.

The third lens frame 17 includes the third lens group 57 composed of a plurality of optical elements, and the third lens group 57 is fixed to and held by the third lens frame 17 at a position near to the rear end thereof.

Further, the groove portion 17a is formed at a predetermined position on the outer peripheral surface of the third lens frame 17 in the vicinity of the rear end thereof. The stopper pin 7 of the first lens frame 15 is inserted into the groove portion 17a.

Further, an urging member 9 such as an extendable spring and the like is interposed between the third lens frame 17 and the second lens frame 16. Accordingly, the third lens frame 17 is urged at all times in a direction where it is separated from the second lens frame 16 in the direction along the optical axis O.

Next, the second lens frame 16 in the lens barrel 1 of the embodiment will be described below in detail.

As shown in FIG. 1, the frame portion 16a of the second lens frame 16 in the lens barrel 1 of the embodiment is formed of a disc-shaped portion having an opening at an approximate center and a cylindrical portion extending integrally rearward from the disc-shaped opening. The second lens group 56 is fixed and held in the cylindrical portion by a predetermined means.

That is, a lens fixing portion is disposed on the inner peripheral surface of the cylindrical portion and it is formed to be able to fix and hold each of the plurality of optical elements (56a, 56b) constituting the second lens group 56.

Here, the frame portion 16a of the second lens frame 16 is formed such that the first lens 56a is inserted from a first opening at a front surface side opening of the cylindrical portion of the frame portion 16a and the second lens 56b is inserted from a second opening at a rear surface side opening thereof. For this purpose, as shown in FIG. 2, the position prescribing surfaces 16c acting as first abutment portions are formed on the approximately overall circumference of the frame portion 16a at a position near to the front surface of a lens fixing portion where the first lens 56a of the second lens group 56 is fixed in order to prescribe the position of the lens in the direction along the optical axis O (refer also to FIG. 3). Further, the position prescribing surfaces 16d acting as first engagement portions are formed on the frame portion 16a in the diameter direction at three positions at approximately similar intervals and engaged with the end surface of the first lens 56a on the outer periphery thereof in order to prescribe the position of the first lens 56a in the diameter direction (refer also to FIG. 3).

Further, as shown in FIG. 2, the position prescribing surface 16e acting as a second abutment portion and the position prescribing surface 16f acting as a second engagement portion are formed on the approximately overall circumference of the lens fixing portion at predetermined positions near to the rear surface thereof, respectively. The position prescribing surface 16e prescribes the position of the second lens 56b of the second lens group 56 in the direction along the optical axis O, and the position prescribing surface 16f is engaged with the end surface of the second lens 56b on the outer periphery thereof in order to prescribe the position of the second lens 56b in the diameter direction.

As described above, the position prescribing surfaces 16d (the first engagement portion) and the position prescribing surface 16c (the first abutment portion) are disposed at positions different from each other in the circumferential direction of the lens holding frame. Then, the first lens 56a of the respective lenses (56a, 56b), which are disposed in the frame portion 16a of the second lens frame 16, is positioned by the position prescribing surface 16c in the direction along the optical axis O and positioned by the position prescribing surfaces 16d in the diameter direction, respectively.

Further, the second lens 56b is positioned by the position prescribing surface 16e in the direction along the optical axis O and positioned by the position prescribing surface 16f in the diameter direction, respectively.

An aperture portion 16g projects inward from the inner periphery of the frame portion 16a at a predetermined position between the lens position prescribing surface 16c and the lens position prescribing surface 16e in the vicinity of the lens position prescribing surface 16c. The aperture portion 16g is formed on the approximately overall inner periphery except the portions where the position prescribing surfaces 16d are formed in the circumferential direction. With this arrangement, the aperture portion can be interposed between the first and second lenses 56a and 56b without adding any member.

Note that grooves 16h are interposed between the lens position prescribing surfaces 16d (first engagement portions) and the lens position prescribing surface 16f (second engagement portion) and extends from the position prescribing surfaces 16d to the position prescribing surface 16f. The position prescribing surfaces 16d and the position prescribing surface 16f are formed by inserting predetermined portions of a rear R mold 23 (second metal mold) into the grooves 16h, which will be described later (this will be described later in detail).

The frame portion 16a of the second lens frame 16 arranged as described above is molded by molds shown in FIGS. 4–10.

Figure 4:
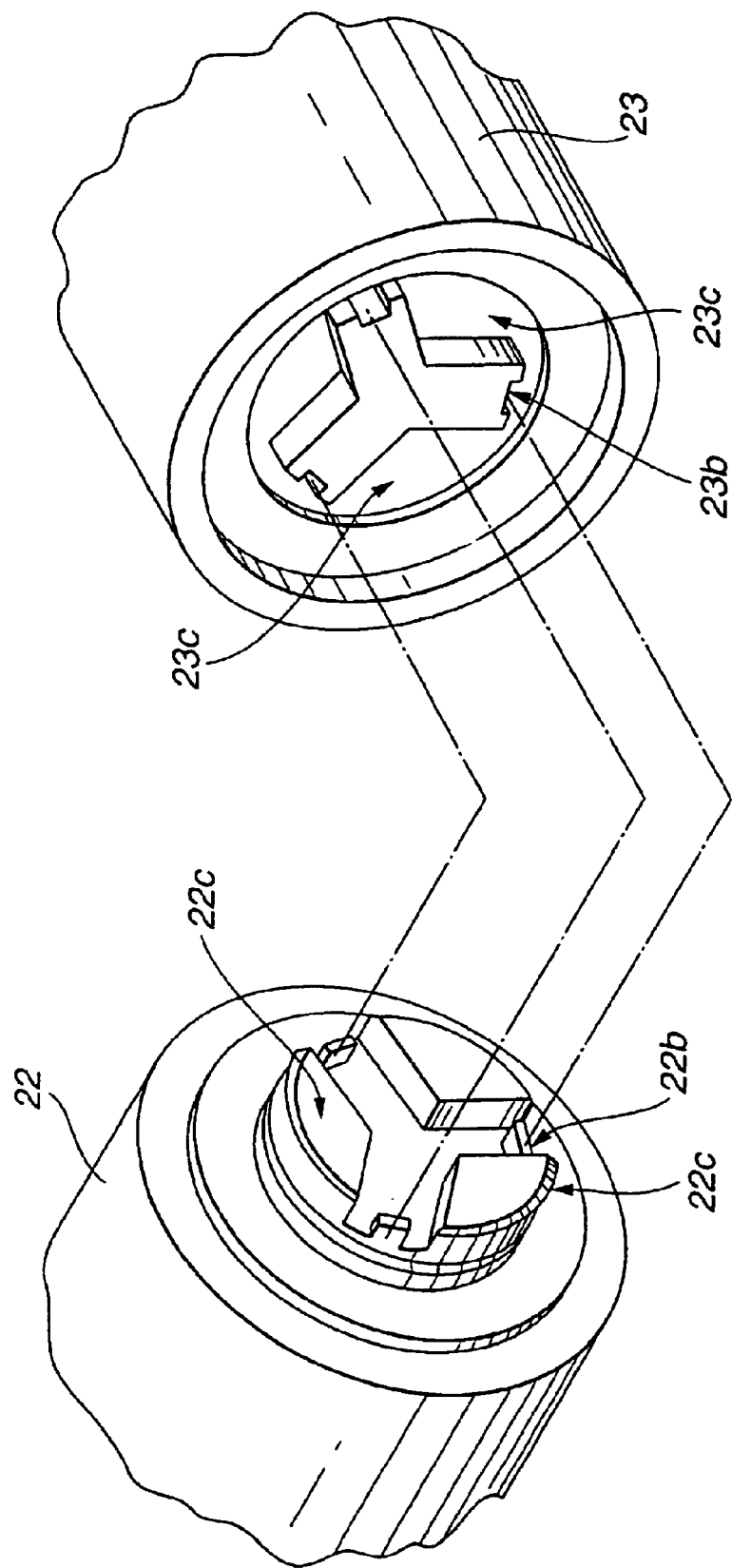
FIG. 4 is a main portion perspective view of molds for molding a part of the second lens frame of a lens holding frame member constituting the lens barrel of FIG. 1.

Here, FIGS. 4–10 show the molds for molding a part of the second lens frame 16 of the lens holding frame members constituting the lens barrel of the embodiment as described above. Of these figures, FIG. 4 is a main portion perspective view of the molds for molding the second lens frame.

Figure 5:
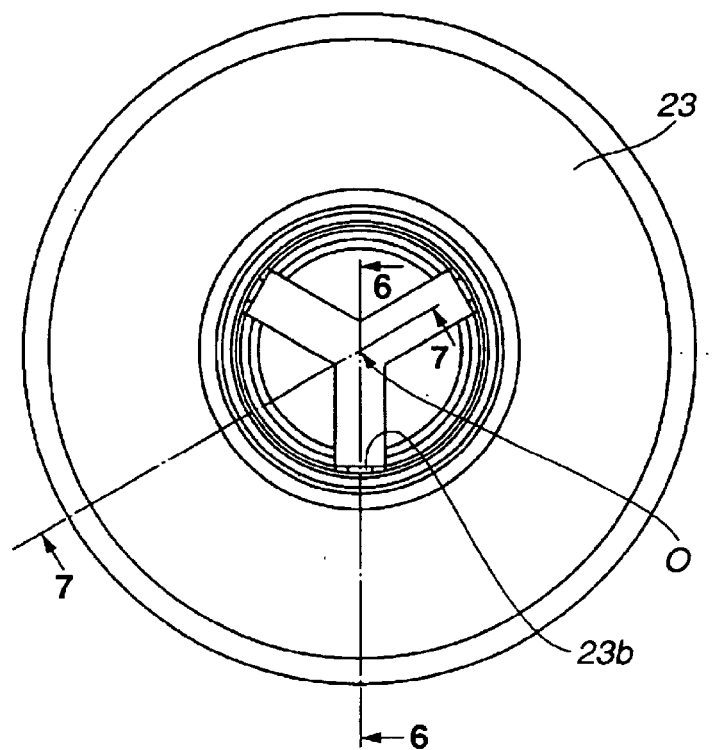
FIG. 5 is a front elevational view of a rear mold R of the molds of FIG. 4.
Figure 6:
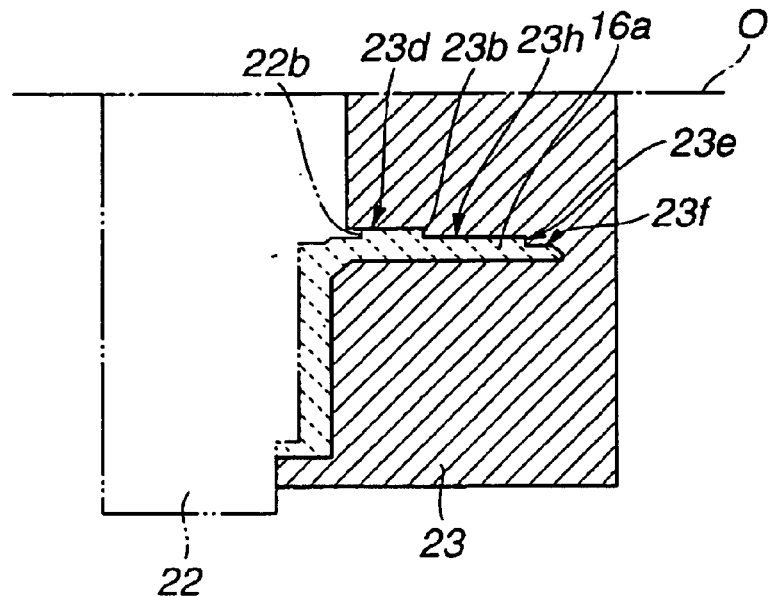
FIG. 6 is a longitudinal sectional view taken along a line 6—6 of FIG. 5.
Figure 7:
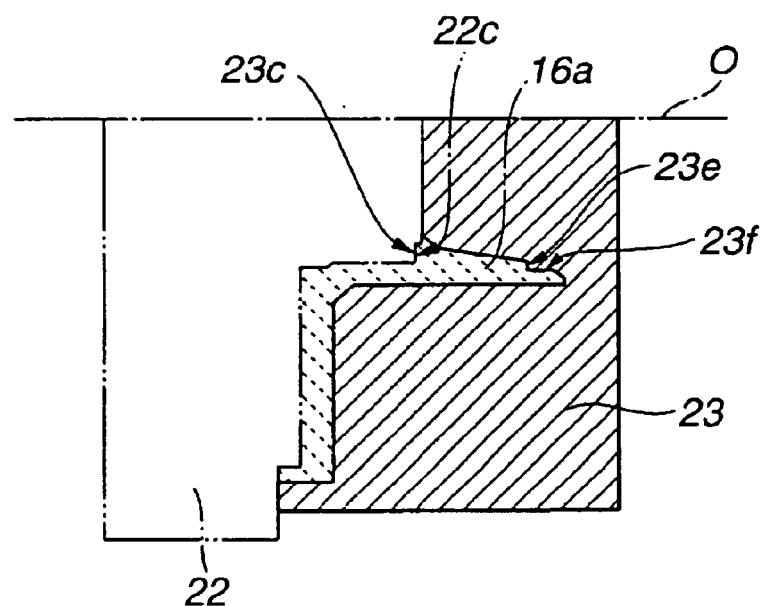
FIG. 7 is a longitudinal sectional view taken along a line 7—7 of FIG. 5.

Further, FIG. 5 shows a front elevational view of the rear mold R of the molds of FIG. 4, FIG. 6 shows a longitudinal sectional view of the mold (rear mold R) taken along a line 6—6 of FIG. 5, and FIG. 7 shows a longitudinal sectional view of the mold (rear mold R) taken along a line 7—7 of FIG. 5, respectively.

Figure 8:
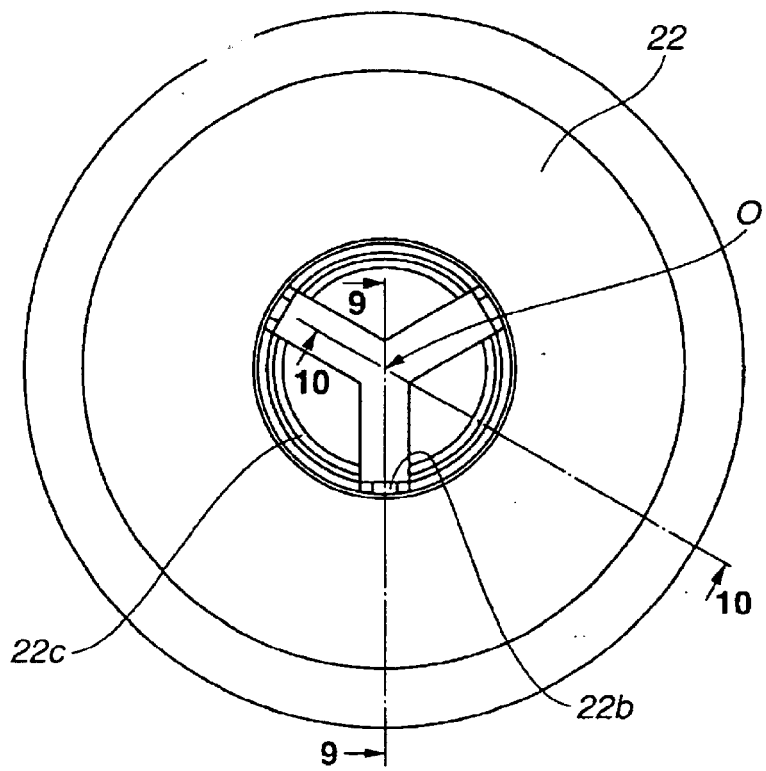
FIG. 8 is a front elevational view of a front mold F of the molds of FIG. 4.
Figure 9:
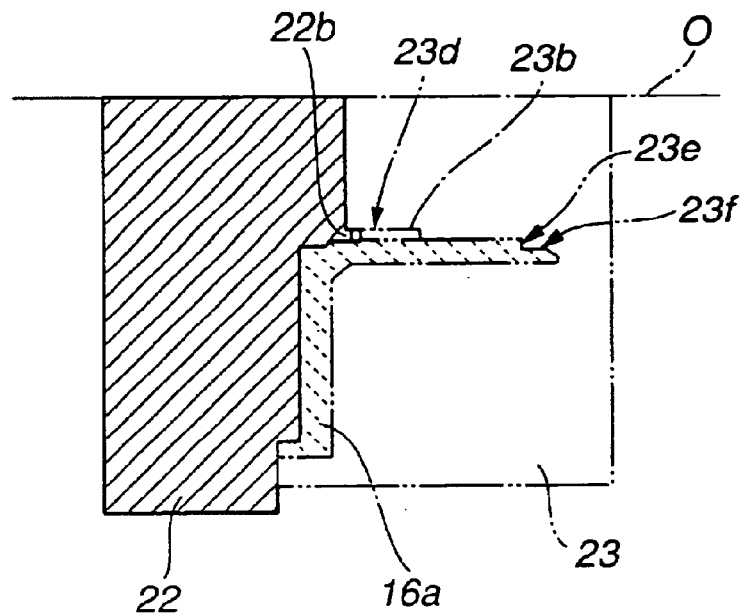
FIG. 9 is a longitudinal sectional view taken along a line 9—9 of FIG. 8.
Figure 10:
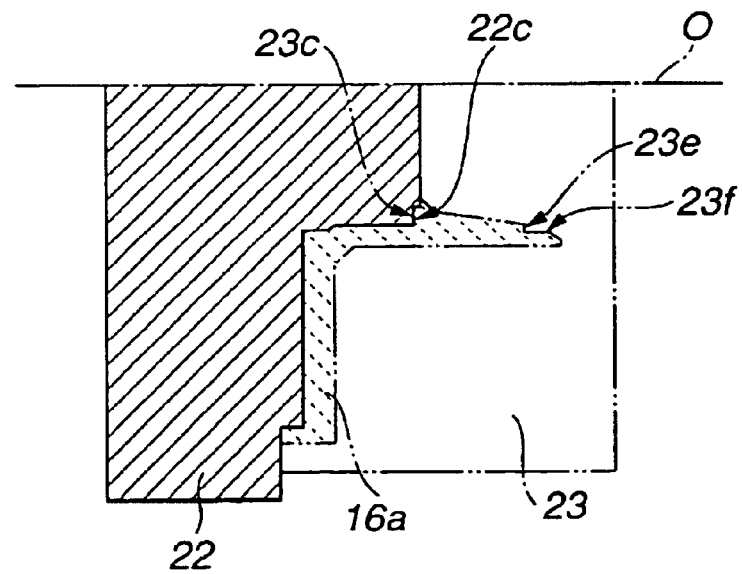
FIG. 10 is a longitudinal sectional view taken along a line 10—10 of FIG. 8.

Then, FIG. 8 shows a front elevational view of a front mold F of the molds of FIG. 4, FIG. 9 shows a longitudinal sectional view of the mold (front mold F) taken along a line 9—9 of FIG. 8, and FIG. 10 shows a longitudinal sectional view of the mold (front mold F) taken along a line 10—10 of FIG. 8, respectively.

As shown in FIG. 4, the molds for molding the frame portion 16a of the second lens frame 16 are composed of the front mold F 22 acting as a first metal mold and the rear mold R 23 acting as a second metal mold.

The front mold F 22 is a member which contributes to form the front surface side region of the frame portion 16a of the second lens frame 16. Further, the rear mold R 23 is a member which contributes to form the rear surface side region of the frame portion 16a.

Here, the rear mold R 23 forms the position prescribing surfaces 16d, 16f, 16e, and the grooves 16h of the frame portion 16a by the regions thereof denoted by reference numerals 23d, 23f, 23e, and 23h of FIG. 6.

Further, the front mold F 22 forms the position prescribing surface 16c of the frame portion 16a by the region thereof denoted by a reference numeral 22c of FIG. 7.

Then, when the front mold F 22 is fitted into the rear mold R 23, the regions, which are denoted by the reference numeral 22b, of the front mold F 22 are engaged with the reference numerals 23b of the rear mold R 23, as shown in FIG. 4. With this arrangement, burrs and the like, which may occur in the diameter direction when the molds are fitted, are suppressed.

That is, since the molds are fitted such that the reference numeral 22b regions can be inserted into and removed from the reference numeral 23 regions in the optical axis direction, burrs occur at the ends of the lens position prescribing surfaces 16d on the first opening 16A side faces the optical axis direction. Accordingly, when the first lens 56a is inserted from the first opening 16A side, an assembly property is not spoiled by the burrs.

The second lens group 56 is attached in the following manner to the frame portion 16a molded by the molds arranged as described above.

That is, the first lens 56a of the second lens group 56 is attached by being dropped from the first opening 16A formed forward in correspondence to the configuration of the first lens 56a, whereas the second lens 56b is attached likewise from the second opening 16B formed rearward in correspondence to the configuration of the second lens 56b.

Then, the first lens 56a has its outer periphery firmly fixed to the frame portion 16a at the end thereof on one side of the openings through an adhesive 300, and the second lens 56b is firmly fixed to the frame portion 16a at the end thereof on the other side of the openings through an adhesive 301.

Figure 11:
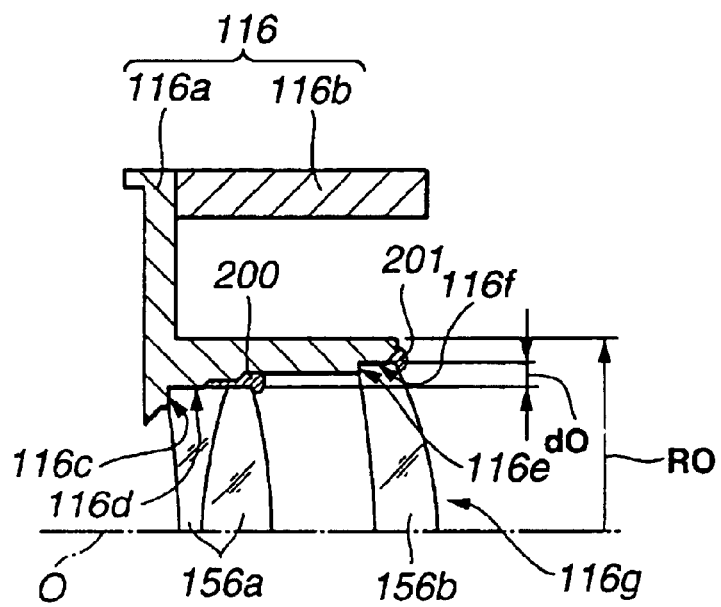
FIG. 11 is an enlarged main portion sectional view showing only an upper half portion of optical elements about the optical axis thereof by taking out a frame member constituting a part of a conventional lens barrel and the optical elements held by the frame member.
Figure 12:
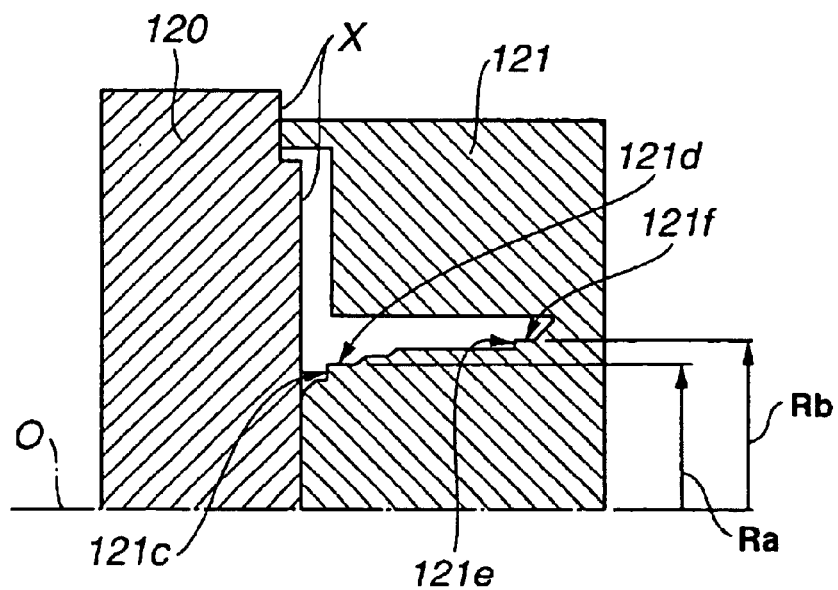
FIG. 12 is a sectional view showing a part of molds for injection molding the frame member shown in FIG. 11, the sectional view showing a region corresponding to FIG. 11.

Since the bonding portions as the fixing means of the first and second lenses 56a, 56b are not interposed therebetween, the step d0 can be reduced as compared with the conventional lens barrel shown in FIG. 11. Accordingly, the above arrangement permits the diameter of the frame portion 16a to be easily reduced.

Operation of the lens barrel 1 of the embodiment arranged as described above will be described below.

The fixing frame 11 is fixed to the fixing member such as the camera and the like (not shown), to which the lens barrel 1 is applied, through the fixing portion 11a. Therefore, the fixing frame 11 is arranged as an immovable member.

First, when a predetermined manipulation is carried out and a predetermined drive means (not shown) is operated, the rotary frame 12 begins to rotate in a predetermined direction. Since the helicoid 12a of the rotary frame 12 is meshed with the helicoid 11c of the fixing frame 11, the rotary frame 12 is extended forward.

Further, the moving frame 13 is coupled with the rotary frame 12 so as to move integrally therewith in the direction along the optical axis O while rotating relatively to the rotary frame 12. Accordingly, as the rotary frame 12 is extended, the moving frame 13 is also moved straight in the same direction integrally therewith.

Then, since the pin portion 25b and the taper portion 25a of the cam follower 25 of the cam frame 14 are inserted into the cam groove 13c of the moving frame 13, the cam frame 14 moves in the direction along the optical axis O while rotating as the rotary frame 12 rotates. That is, the cam frame 14 is also extended forward.

Here, the float key 8 is disposed to the cam frame 14 so as to move integrally therewith in the optical axis direction and to rotate relatively thereto about the optical axis. Since the key portion 8b of the float key 8 is engaged with the straight groove 13d of the moving frame 13, the float key 8 is guided straight by the moving frame 13 in direction along the optical axis O. Further, the key portion 8c of the float key 8 is engaged with the straight groove 15c of the first lens frame 15 to thereby guide straight in the direction along the optical axis O of the first and third lens frames 15 and 17.

Therefore, when the cam frame 14 moves straight in an extending direction while rotating, the first lens frame 15 is extended because the helicoid 14b of the cam frame 14 is meshed with the helicoid 15a of the first lens frame 15. In this case, the first lens frame 15 is extended without being rotated because it is guided straight by the float key 8.

Further, as the first lens frame 15 is moved straight in the extending direction, the third lens frame 17 is moved in the same direction following the first lens frame 15 because the stopper pin 7 of the first lens frame 15 is inserted into the groove portion 17a of the third lens frame 17.

Further, since the cam follower 10 is cam-coupled with the cam groove 14d of the cam frame 14, the second lens frame 16 is moved straight in the direction along the optical axis O while being guided straight by the first lens frame 15. With this operation, the second lens frame 16 is also extended forward by a predetermined amount.

As described above, according to the first embodiment, when the second lens group 56 is assembled to the frame portion 16a of the second lens frame 16, one of the optical elements of the second lens group 56, that is, the first lens 56a is attached by being dropped from the front side opening of the frame portion 16a, and the second lens 56b as the other of the optical elements of the second lens group 56 is attached from the rear side opening of the frame portion 16a in the same manner.

The first lens 56a is positioned by the lens position prescribing surfaces 16d in the diameter direction formed by the region, which is denoted by the reference numeral 23d, of the rear mold R 23. In contrast, the position in the diameter direction of the second lens 56b is prescribed by the lens position prescribing surface 16f formed by the region, which is denoted by the reference numeral 23f, of the rear mold R 23 that is the same mold as that forming the position prescribing surfaces 16d. As described above, high accurate coaxiality can be guaranteed by the same mold member.

Further, as to the optical axis direction, the first lens 56a is positioned by the lens position prescribing surfaces 16c formed by region, which is denoted by the reference numeral 22c, of the front mold F 22 abutted against an end surface 23c of the rear mold R 23. Then, the second lens 56b is prescribed by the lens position prescribing surface 16e formed by the region, which is denoted by the reference numeral 23e, of the rear mold R 23. With this arrangement, the positions in the optical axis direction of the first and second lenses 56a and 56b are prescribed together by the position prescribing surfaces 16c and 16e the shapes of which and the interval between which are determined by the rear mold R 23, thereby the interval between the first and second lenses 56a and 56b can be maintained with a high accuracy.

Accordingly, a step in the diameter direction which is occurred when the plurality of optical elements (56a, 56b) constituting the second lens group 56 are disposed in the frame portion 16a can be reduced, thereby the outside dimension φR1 (refer to FIG. 1) of the frame portion 16a itself can be reduced as compared with that of the conventional lens barrel.

Then, the present invention contributes to reduce the size of the frame portion 16a and furthermore to reduce the size of the lens barrel 1 while maintaining a high relative eccentric accuracy between the plurality of optical elements (56a, 56b) when they are fixed to the frame portion 16a.

It is apparent that different embodiments can be arranged based on the present invention in a wide range without departing from the spirit and scope of the invention. The present invention is by no means restricted by the specific embodiments thereof except that it is limited by the appended claims.

What is claimed is:

1. A lens barrel having a lens holding frame for holding a plurality of lenses comprising:
    a first lens;
    a second lens;
    a lens holding frame holding the first and second lenses, having a first opening disposed at one end in correspondence with the first lens and having a second opening disposed at another end in correspondence with the second lens;
    first abutment portions prescribing a given position of the first lens in an optical axis direction on a side of the first opening and disposed at a plurality of positions around an inner periphery of the lens holding frame;
    a second abutment portion prescribing a given position of the second lens in the optical axis direction on a side of the second opening;
    first engagement portions disposed at a plurality of positions around the inner periphery of the lens holding frame on a side nearer to the first opening than the first and second abutment portions and engaged with the first lens; and
    a second engagement portion disposed around the inner periphery of the lens holding frame on a side nearer to the second opening than the first and second abutment portions and engaged with the second lens;
    wherein the first engagement portions and the first abutment portions are disposed at different positions in measured in a circumferential direction of the lens holding frame.

2. A lens barrel according to claim 1, wherein the lens holding frame is molded by injection molding, and the first engagement portions and the second engagement portion are molded by the same metal mold.

3. A lens barrel according to claim 1, wherein the first engagement portions have a diameter smaller than that of the second engagement portion.

4. A lens barrel according to claim 3 comprising:
groove portions disposed on the inner periphery of the lens holding frame and extending from the first engagement portions to the second engagement portion;
wherein the groove portions are molded by the same metal mold as that of the first engagement portions and the second engagement portion.

5. A lens barrel according to claim 3, wherein the lens holding frame is molded by a first metal mold on the first opening side and a second metal mold on the second opening side, and the first engagement portions and the second engagement portion are molded by the second metal mold.

6. A lens barrel according to claim 1, wherein the first abutment portions and the first engagement portions are respectively formed at at least three positions in the circumferential direction.

7. A lens barrel according to claim 6, wherein the first abutment portions and the first engagement portions are disposed in an alternating manner in the circumferential direction of the lens holding frame.

8. A lens barrel according to claim 6, wherein the first abutment portions are longer than the first engagement portions in the circumferential direction.

9. A lens barrel comprising:
a first lens;
a second lens;
a lens holding frame holding the first and second lenses, having a first opening disposed at one end in correspondence with the first lens, and having a second opening disposed at another end in correspondence with the second lens;
a first engagement portion disposed on the lens holding frame on a side of the first opening thereof, and engaged with the first lens; and
a second engagement portion disposed on the lens holding frame on a side of the second opening thereof and engaged with the second lens;
wherein the first and second engagement portions are molded by a metal mold.

10. A lens barrel according to claim 9, wherein the first engagement portions have a diameter smaller than that of the second engagement portion.

11. A lens barrel according to claim 10, wherein the lens holding frame is molded by a first metal mold on the first opening side and a second metal mold on the second opening side, and the first and second engagement portions are molded by the second metal mold.

12. A lens barrel according to claim 11, wherein a plurality of the first engagement portions extend in a circumferential direction of the lens holding frame.

13. A lens barrel according to claim 12 comprising:
a groove portion disposed on the lens holding frame and extending from the first engagement portions to the second engagement portion;
wherein the groove portion is molded by the second metal mold.

14. A lens barrel comprising:
a first lens;
a second lens, a diameter of which is larger than a diameter of the first lens;
an annular lens holding frame holding the first and second lenses, having a first opening disposed at one end in correspondence with the first lens, and having a second opening disposed at another end in correspondence with the second lens, the lens holding frame being molded by a first metal mold on a side of the first opening and a second metal mold on a side of the second opening;
first abutment portions prescribing the position of a first lens in an optical axis direction on the first opening side, disposed at a plurality of positions around an inner periphery of the lens holding frame, and projecting toward the inner periphery of the lens holding frame, respectively, the first abutment portions being molded by the first metal mold;
a second abutment portion prescribing a position of the second lens in the optical axis direction on the second opening side, the second abutment portion being molded by the second metal mold;
first engagement portions disposed at a plurality of positions around the inner periphery of the lens holding frame on a side nearer to the first opening than the first and second abutment portions, and engaged with the first lens, the first engagement portions being molded by the second metal mold; and
a second engagement portion disposed around the inner periphery of the lens holding frame on a side nearer to the second opening than the first and second abutment portions and engaged with the second lens, the second engagement portion being molded by the second metal mold;
wherein the first engagement portions and the first abutment portions are disposed at different positions in a circumferential direction of the lens holding frame.

15. A lens barrel according to claim 14, wherein the first engagement portions project toward the inner periphery of the lens holding frame, and a diameter of the first engagement portions is formed smaller than a diameter of the second engagement portion so as to be molded by the second metal mold.

16. A lens barrel according to claim 15, wherein the first abutment portions and the first engagement portions are respectively formed at at least three positions in the circumferential direction.

17. A lens barrel according to claim 16, wherein the first abutment portions and the first engagement portions are disposed in an alterating manner in the circumferential direction of the lens holding frame.

18. A lens barrel according to claim 16, the first abutment portions are longer than the first engagement portions in the circumferential direction.

19. A lens barrel according to claim 15 comprising:
a groove portion disposed on the inner periphery of the lens holding frame and extending from the first engagement portions to the second engagement portion;
wherein the groove portion is molded by the second metal mold.

* * * * *

UNITED STATES PATENT AND TRADEMARK OFFICE
CERTIFICATE OF CORRECTION

| | |
|---|---|
| PATENT NO. | : 6,785,059 B2 |
| DATED | : August 31, 2004 |
| INVENTOR(S) | : Tamotsu Koiwai |

It is certified that error appears in the above-identified patent and that said Letters Patent is hereby corrected as shown below:

Column 2,
Line 63, delete "(=(Rb·Ra)/2)" and insert -- (=(Rb-Ra)/2) --.

Column 3,
Line 25, "Further" should be the beginning of a new paragraph.

Column 9,
Line 8, "For" should be the beginning of a new paragraph.

Column 12,
Line 67, after "positions", delete "in".

Column 13,
Line 6, delete "the same" and insert -- a common --.
Line 10, delete "3" and insert -- 2 --.

Column 14,
Line 52, delete "alterating" and insert -- alternating --.
Line 62, insert the following claims:

20. A mold for molding a lens holding frame, which frame is designed to hold a plurality of lenses, said mold comprising:
said mold having an annular-shaped first projection for forming a first opening disposed at one end of the lens holding frame for holding a first lens and a second annular shaped projection for forming a second opening disposed at another end of the frame for holding a second lens;
said first projection having a first group of recesses for forming first abutment portions for prescribing a given position of the first lens in an optical axis direction on a side of the first opening and disposed at a plurality of positions around an inner periphery of the lens holding frame;
said second projection having a ledge for forming a second abutment portion for prescribing a given position of the second lens in the optical axis direction on a side of the second opening;
said first projection having a second group of recesses for forming first engagement portions disposed at a plurality of positions around the inner periphery of the lens holding frame on a side nearer to the first opening than the first and second abutment portions for engagement with the first lens; and
said second projection having an annular section extending from said ledge for forming a second engagement portion disposed around the inner periphery of the lens holding frame on a side nearer to the second opening than the first and second abutment portions for engagement with the second lens;
wherein the first engagement portions and the first abutment portions are disposed at different positions along a circumferential direction of the lens holding frame.

21. A mold according to claim 20, wherein the mold is comprised of forward and rearward mold members which cooperate to form a lens holding element, and the first engagement portions and the second engagement portion are both molded by one of the forward and rearward mold members.

UNITED STATES PATENT AND TRADEMARK OFFICE
CERTIFICATE OF CORRECTION

PATENT NO. : 6,785,059 B2
DATED : August 31, 2004
INVENTOR(S) : Tamotsu Koiwai

It is certified that error appears in the above-identified patent and that said Letters Patent is hereby corrected as shown below:

Column 14 (cont'd),

22. A mold according to claim 21 comprising:
said mold having a shape to form groove portions disposed on the inner periphery of the lens holding frame and extending from the first engagement portions to the second engagement portion;
wherein the groove portions are molded by said the mold members employed for molding the first engagement portions and the second engagement portion.

23. A mold according to claim 20, wherein the lens holding frame is molded by first and second metal molds, said first metal mold forming the first opening side and the second metal mold forming the second opening side.

24. A mold for forming a lens holding frame, which frame is designed to hold a first lens and a second lens, comprising:
said mold having a shape for forming the lens holding frame to provide a first opening disposed at one end for receiving the first lens, and having a second opening disposed at another end for receiving the second lens;
said mold having a further shape for forming a first engagement portion disposed on the lens holding frame on a side of the first opening thereof for engagement with the first lens; and
said mold having a further shape for forming a second engagement portion disposed on the lens holding frame on a side of the second opening thereof for engagement with the second lens;
wherein said mold is a metal mold which molds the first and second engagement portions.

25. A mold according to claim 24, wherein the mold comprises first and second metal molds, the lens holding frame being molded by the first metal mold on the first opening side and the second metal mold on the second opening side, and the first and second engagement portions being molded by the second metal mold.

26. A lens barrel comprising:
a mold for forming a lens holding frame for holding a first lens; and
a second lens, a diameter of which is larger than a diameter of the first lens;
said mold having a shape for forming the holding frame which is an annular-shaped lens holding frame having a first opening disposed at one end to receive the first lens, and having a second opening disposed at another end to receive the second lens, the mold comprising first and second metal molds, the first metal mold being on a side of the first opening and the second metal mold being on a side of the second opening;
first abutment portions prescribing a position of the first lens in an optical axis direction on the first opening side, disposed at a plurality of positions around an inner periphery of the lens holding frame, and projecting toward the inner periphery of the lens holding frame, respectively, the first abutment portions being molded by the first metal mold;
a second abutment portion prescribing a position of the second lens in the optical axis direction on the second opening side, the second abutment portion being molded by the second metal mold;
first engagement portions disposed at a plurality of positions around the inner periphery of the lens holding frame on a side nearer to the first opening than the first and second abutment portions, and engaged with the first lens, the first engagement portions being molded by the second metal mold; and
a second engagement portion disposed around the inner periphery of the lens holding frame on a side nearer to the second opening than the first and second abutment portions and engaged with the second lens, the second engagement portion being molded by the second metal mold;
wherein the first engagement portions and the first abutment portions are disposed at different positions in a circumferential direction of the lens holding frame.

UNITED STATES PATENT AND TRADEMARK OFFICE
CERTIFICATE OF CORRECTION

PATENT NO. : 6,785,059 B2
DATED : August 31, 2004
INVENTOR(S) : Tamotsu Koiwai

It is certified that error appears in the above-identified patent and that said Letters Patent is hereby corrected as shown below:

Column 14 (cont'd),

27. A lens barrel according to claim 26, wherein the first engagement portions project toward the inner periphery of the lens holding frame, and a diameter of the first engagement portions is formed so as to be smaller than a diameter of the second engagement portion molded by the second metal mold.

28. A lens barrel according to claim 26 comprising:
    said mold forming a groove portion disposed on the inner periphery of the lens holding frame and extending from the first engagement portions to the second engagement portion;
    wherein the groove portion is molded by the second metal mold.

Signed and Sealed this

Twenty-fourth Day of January, 2006

JON W. DUDAS
*Director of the United States Patent and Trademark Office*